US011935333B2

(12) United States Patent
Beenken (10) Patent No.: US 11,935,333 B2
(45) Date of Patent: Mar. 19, 2024

(54) VEHICLE IDENTIFICATION MEANS

(71) Applicant: Tönnjes ISI Patent Holding GmbH, Delmenhorst (DE)

(72) Inventor: Björn Beenken, Ganderkesee/Rethorn (DE)

(73) Assignee: Tönnjes ISI Patent Holding GmbH, Delmenhorst (DE)

( * ) Notice: Subject to any disclaimer, the term of this patent is extended or adjusted under 35 U.S.C. 154(b) by 853 days.

(21) Appl. No.: 16/982,216

(22) PCT Filed: Mar. 26, 2019

(86) PCT No.: PCT/EP2019/000094
§ 371 (c)(1),
(2) Date: Sep. 18, 2020

(87) PCT Pub. No.: WO2019/185192
PCT Pub. Date: Oct. 3, 2019

(65) Prior Publication Data
US 2021/0027553 A1 Jan. 28, 2021

(30) Foreign Application Priority Data
Mar. 28, 2018 (DE) .......................... 102018002585.4

(51) Int. Cl.
*H01Q 1/32* (2006.01)
*B60R 13/10* (2006.01)
(Continued)

(52) U.S. Cl.
CPC .............. *G07C 5/008* (2013.01); *B60R 13/10* (2013.01); *G06K 19/0724* (2013.01);
(Continued)

(58) Field of Classification Search
CPC .... H01Q 1/3283; H01Q 1/325; H01Q 1/3233; H01Q 1/38; H01Q 1/44; H01Q 1/1271;
(Continued)

(56) References Cited

U.S. PATENT DOCUMENTS 6,025,784 A * 2/2000 Mish ...................... G08G 1/017
343/866
6,628,209 B1 * 9/2003 Rother .................... B60R 13/10
40/200
(Continued)

FOREIGN PATENT DOCUMENTS

DE 202005018589 U1 4/2007
DE 102014012291 A1 2/2016
(Continued)

OTHER PUBLICATIONS

WIPO, International Search Report (in priority application), dated Aug. 28, 2019.
(Continued)

*Primary Examiner* — Linh V Nguyen
(74) *Attorney, Agent, or Firm* — Laurence P. Colton; Smith Tempel Blaha LLC (57) ABSTRACT

A vehicle identification means serve to identify vehicles by means of a unique identification. The protection of such identifications against falsification and tampering proves particularly problematic. For this purpose, known vehicle identification means have data carriers which can be read out in a contactless fashion and on which data for permitting unambiguous identification are stored. However, such identification means are very complex in design and are susceptible to faults. The invention provides an improved vehicle identification means which has a design which is as simple as possible and has a lower level of susceptibility to faults. This is ensured in that at least one NFC transponder which can be read out in a contactless fashion and has the purpose
(Continued)

of near-field communication with a data carrier and an antenna is assigned to a registration number plate body, wherein at least part of the antenna is arranged in a breakthrough.

25 Claims, 4 Drawing Sheets

(51) Int. Cl.
    *G06K 19/07*     (2006.01)
    *G06K 19/077*     (2006.01)
    *G07C 5/00*     (2006.01)

(52) U.S. Cl.
    CPC . *G06K 19/07758* (2013.01); *G06K 19/07786* (2013.01); *H04B 5/26* (2024.01); *H04B 5/45* (2024.01); *H04B 5/72* (2024.01); *H04B 5/77* (2024.01)

(58) Field of Classification Search
    CPC ...... H01Q 1/2216; H01Q 1/2225; H01Q 1/24; H01Q 1/3208; H01Q 1/40; H01Q 1/405; H01Q 11/08; H01Q 13/10; H01Q 13/106; H01Q 21/064; H01Q 21/28; H01Q 9/30; B60R 13/10; B60R 13/105; B60R 11/02; B60R 2011/0096; B60R 21/01; B60R 2325/105; B60R 25/00; B60R 25/102; B60R 25/25; B60R 25/34; G06K 19/07758; G06K 19/07773; G06K 19/07749; G06K 19/0776; G06K 19/0723; G06K 19/07783; G06K 7/10366; G06K 19/02; G06K 19/04; G06K 19/0724; G06K 19/073; G06K 19/07716; G06K 19/07722; G06K 19/07728; G06K 19/07769; G06K 19/07786; G06K 19/07798; G06K 19/10; G06K 19/14; G06K 19/16
    USPC ............... 343/711, 713, 866, 867, 741, 742, 343/700 MS
See application file for complete search history.

(56) References Cited

U.S. PATENT DOCUMENTS

| | | | | |
|---|---|---|---|---|
| D526,015 S | * | 8/2006 | Allard | D19/9 |
| D527,421 S | * | 8/2006 | Allard | D19/9 |
| 7,463,150 B2 | * | 12/2008 | Rajan | G06K 19/0776 340/572.1 |
| 8,002,173 B2 | * | 8/2011 | Ackley | H04Q 9/00 235/375 |
| 8,393,547 B2 | * | 3/2013 | Kiekhaefer | G06K 19/07771 235/487 |
| 9,443,183 B2 | * | 9/2016 | Matsur | G07C 9/20 |
| 9,812,782 B2 | * | 11/2017 | Finn | G06K 19/07747 |
| D898,646 S | * | 10/2020 | Vincent | D12/193 |
| 2009/0058602 A1 | * | 3/2009 | Harinck | B60R 25/00 340/10.1 |
| 2011/0258894 A1 | * | 10/2011 | Beenken | G06K 19/07783 40/208 |
| 2012/0019363 A1 | | 1/2012 | Fein | |
| 2015/0170019 A1 | | 6/2015 | Beenken | |
| 2018/0182217 A1 | * | 6/2018 | Lamothe | G08B 13/2477 |
| 2021/0387582 A1 | * | 12/2021 | Pretorius | G06K 19/07773 |

FOREIGN PATENT DOCUMENTS

| | | |
|---|---|---|
| JP | 2012507896 A | 3/2012 |
| JP | 2017530898 A | 10/2017 |
| JP | 2018011111 A | 1/2018 |
| WO | 9919170 A1 | 4/1999 |
| WO | 2010051980 A1 | 5/2010 |
| WO | 2014012676 A2 | 1/2014 |
| WO | 2016026543 A1 | 2/2016 |

OTHER PUBLICATIONS

Taiwan Patent Office, Search Report (in related applicatin), dated Apr. 15, 2020.
Japanese Patent Office, Office Action (in a related application), dated Dec. 22, 2021.
IP Australia, Office Action (in a related application), dated Aug. 18, 2022.

* cited by examiner

VEHICLE IDENTIFICATION MEANS

CROSS-REFERENCE TO RELATED APPLICATIONS

This application is the US National Phase of and claims the benefit of and priority on International Application No. PCT/EP2019/000094 having an international filing date of 26 Mar. 2019, which claims priority on and the benefit of German Patent Application No. 10 2018 002 585.4 having a filing date of 28 Mar. 2018.

BACKGROUND OF THE INVENTION

Technical Field

The invention relates to a vehicle identification means, in particular a vehicle registration number plate having a registration number plate body which has at least one inscription space, and having at least one inscription which is assigned to the inscription space of the registration number plate body, wherein at least one NFC transponder which can be read out in a contactless fashion and has the purpose of near-field communication is assigned to the registration number plate body, having a data carrier and an antenna, and wherein the registration number plate body is covered with a protective cover.

The vehicle identification means claimed here serves to identify vehicles by means of a unique identification. This identification preferably includes a combination of digits and/or numbers or else other data which can be assigned in unambiguous fashion. For the unambiguous assignment of an identification to a vehicle, the vehicle identification means is attached, for example, as what is referred to as a number plate at the front and/or rear on the bodywork or bumper of the vehicle. Alternatively, or else additionally, the vehicle identification means can also be fastened or bonded, for example, to a window pane or windscreen. Furthermore, it is also conceivable for the vehicle identification means described here to serve as supplementary registration number Plate or "third registration number Plate" in addition to the known number plates.

The falsification protection of vehicle identification means proves particularly problematic. Such identification means are very frequently falsified, tampered with or removed in an unauthorized fashion from a vehicle, in order to be used for other vehicles. A measure for preventing this is to use vehicle identification means which have a data carrier which can be read out in a contactless fashion. All the data which are necessary for the unambiguous identification of the vehicle can be stored on this data carrier to this end. Therefore, for example, the combinations of letters and numbers of the actual registration number plate, the type of vehicle and information about the registered owner of the vehicle can be stored in the data memory.

The data carrier is usually read out by means of a reading device which is not part of the vehicle. Such reading devices can be known transceiver units which have different ranges depending on the wavelength range used. By comparing the read-out data with those of the vehicle it is possible to draw conclusions about possible falsification or tampering. In particular, by comparing the data it is possible to determine whether the identification means and/or the registration number plate are/is assigned to the correct vehicle.

Prior Art

Previously known registration number plates with data carriers which can be read out in a contactless fashion have a separate antenna. This antenna (or also antenna structure) which forms a transponder, together with the data carrier, is usually arranged on a metallic registration number plate body. However, this arrangement of the antenna structure on the registration number plate body is associated with a high level of susceptibility to faults, in particular when reading out the data carrier. This susceptibility to faults can be avoided only by a costly and complex design of the vehicle identification means.

The invention is based on the object of providing an improved vehicle identification means which has a design which is as simple as possible and less susceptible to faults.

BRIEF SUMMARY OF THE INVENTION

A vehicle identification means for solving this problem is a vehicle identification means, in particular vehicle a registration number plate, that has a registration number plate body which has at least one inscription space with at least one inscription. At least one NFC transponder which can be read out in a contactless fashion and has the purpose of near-field communication is assigned to the registration number plate body. This NFC transponder has a data carrier and an antenna. A protective cover covers the registration number plate body together with the NFC transponder. Moreover, the registration number plate body has a breakthrough, to which the antenna of the NFC transponder is at least partially assigned. The breakthrough which is claimed here in the registration number plate body can have virtually any desired shape. One preferred shape of the breakthrough is a rectangle, an oval or a circle or any desired border. This breakthrough is a continuous opening in the registration number plate body, which can also be referred to as an open space or cutout. An external electromagnetic field for transmitting data and supplying energy is coupled particularly effectively and reliably to the antenna of the NFC transponder by virtue of the assignment of the antenna to the breakthrough. As a result of this coupling, the data carrier of the transponder can both be read out and written to and, insofar as it is a passive component, supplied with electrical energy. According to the invention there can be provision that the antenna overlaps the breakthrough completely or partially or does not overlap it at all. Insofar as the antenna of the NFC transponder does not overlap with the boundary of the breakthrough, the antenna is to be positioned at a short distance, i.e. of a few millimetres or centimetres, from the boundary on the registration number plate body, so that despite the spacing apart there is still sufficient coupling between the antenna of the NFC transponder and the boundary of the breakthrough.

The border of the breakthrough forms a slot antenna, or a slot antenna is provided by the registration number plate body with the breakthrough. The physical properties and/or the antenna properties of the slot antenna and/or of the breakthrough are comparable with those of a dipole antenna.

The arrangement of the data carrier in the breakthrough provides a particularly flat registration number plate structure. As a result of this arrangement of the data carrier in or over and/or on the breakthrough, the data carrier and/or the transponder per se is virtually no longer able to be perceived by an external viewer as a result of the protective cover. This visual protection of the data carrier is particularly advantageous, in particular, for possible attempts at tampering, since the data carrier and/or the NFC transponder cannot be seen immediately.

The present invention can furthermore preferably provide that the data carrier and/or at least sections of the antenna of the NFC transponder are cast in the breakthrough in an electrically non-conductive sealing compound, in particular a plastic or a resin, in particular that the breakthrough is filled with the sealing compound. As a result of this casting of the essential components of the NFC transponder with the registration number plate body, the transponder becomes an integral component of the vehicle identification means. Releasing the transponder from the breakthrough leads inevitably to the destruction of at least the antenna. Moreover, the sealing compound provides ideal protection of the electrical components, in particular of the antenna and of the data carrier, against environmental influences such as, for example, humidity, dirt but also cold and heat.

A further advantageous exemplary embodiment of the present invention can provide that the antenna of the NFC transponder includes, in particular, windings of the antenna, a conductor loop or a coil, a rectangular or a round or circular surface, and a side edge of this surface corresponds in its length or a circumference of this surface corresponds in its diameter, at maximum to a length of the breakthrough, is preferably smaller, and a height of the breakthrough corresponds to at least 10%, in particular at least 25%, preferably at least 50%, of a width of the surface or of the diameter of the surface. The relative dimensioning of the antenna and of the breakthrough constitute, for the application case described here, an important property for the communication with an external reading device. The external reading device generates a high-frequency electromagnetic alternating field in the frequency range of 13.56 MHz in order to couple to the antenna of the NFC transponder. This alternating field penetrates the antenna surface or coil surface and the breakthrough. As a result, an electromagnetic voltage is induced in the antenna, which electromagnetic voltage supplies the NFC transponder, as a passive integrated circuit, with the necessary electrical energy. As a result of the at least partial overlapping of the antenna with the breakthrough, the external electromagnetic field can couple particularly well to the antenna. In this context it is essential that the antenna surface or the surface which is enclosed by the antenna loop or the coil is smaller than the breakthrough, at least in one dimension, parallel to the plane of the registration number plate body, that is to say in the x or y direction. Moreover, it is advantageous that the portion of the antenna which overlaps with the registration number plate body, that is to say does not drop into the breakthrough, is electrically or galvanically isolated from the registration number plate body.

Furthermore, there can be provision according to the invention that the NFC transponder, in particular the antenna, is arranged at any desired position in the breakthrough, wherein at least two partial regions of the antenna which lie opposite one another are arranged over the breakthrough. The location at which the NFC transponder is arranged along the slot is not significant for the coupling of the external electromagnetic field and therefore the performance or power of the transponder. The same also applies to the emission characteristic of the transponder. In this way, the NFC transponder can be assigned to the registration number plate body or the identification means in a particularly simple and flexible way.

Furthermore, it is a particularly advantageous development of the invention that the NFC transponder with the antenna and the data carrier is arranged on a, preferably self-adhesive, carrier material directly on a front side of the registration number plate body and at least partly over the breakthrough, and the protective cover is applied to the registration number plate body over the NFC transponder.

As a result of this layered structure, composed of the registration number plate body, a carrier material, the NFC transponder and the protective cover, the identification means can, on the one hand, read out and transmit data particularly free of faults and, on the other hand, it constitutes in respect of manufacture a system which can be implemented particularly easily. Furthermore, as a result of this layered structure the NFC transponder becomes an integral component of the registration number plate. The NFC transponder is incorporated into the registration number plate.

A further advantageous exemplary embodiment of the invention can provide that the NFC transponder with the antenna and the data carrier is arranged on a, preferably self-adhesive, carrier material directly on a rear side of the registration number plate body and at least partially over the breakthrough. As a result of the arrangement on the rear side, the transponder is particularly efficiently protected against attempts at tampering and environmental influences.

A vehicle identification means for achieving the object mentioned at the beginning is a vehicle identification means, in particular vehicle registration number plate having a registration number plate body which has at least one inscription space, and having at least one inscription which is assigned to the inscription space of the registration number plate body, wherein at least one NFC transponder which can be read out in a contactless fashion and has the purpose of near-field communication is assigned to the registration number plate body, having a data carrier and an antenna, and wherein the registration number plate body is covered with a protective cover, characterized in that the NFC transponder with the antenna and the data carrier on a carrier material is assigned to a registration number plate body. Accordingly, there is provision that the NFC transponder with the antenna and the data carrier on a carrier material is assigned to the registration number plate body. This application of the NFC transponder with the carrier material on the registration number plate body constitutes a particularly simple and secure way of equipping a vehicle identification means with an NFC transponder. By means of the carrier material with which the NFC transponder is applied to the registration number plate body, sufficient electromagnetic insulation or decoupling of the registration number plate body can be brought about, with the result that the coupling of an electromagnetic field for reading out the data carrier can take place in a reliable way. It is also conceivable that the NFC transponder is attached directly or on the protective cover on a front side, preferably in a recess in the registration number plate body and the protective cover or a protective film is applied to the registration number plate body over the NFC transponder, wherein, in particular, the NFC transponder is cast in the recess with a sealing compound. As a result of this integration, the transponder is incorporated into the identification means. It therefore forms an integral component of the identification means, and it can only be removed from the vehicle identification means by damaging or destroying it. This integration therefore provides not only increased protection against environmental influences but also with respect to mechanical effects and attempts at tampering.

Furthermore, it is conceivable that the NFC transponder is attached directly on a rear side, preferably in a recess, in the registration number plate body, wherein, in particular, the NFC transponder is cast in the recess with a sealing compound.

Furthermore, there can be provision according to the invention that an electrically insulating layer, preferably a plastic or a surface coating agent layer, is arranged between the, preferably self-adhesive, carrier material of the NFC transponder and the registration number plate body. This additional insulating layer serves to provide further electrical decoupling of the NFC transponder from the registration number plate body. The electromagnetic field to which the NFC transponder is subjected is absorbed virtually exclusively by the antenna of the NFC transponder and serves not only for transmitting information but also for supplying energy to the transponder. The supplying of energy to the transponder, which is usually a passive component, is essential for the emission of the identification information in the form of electromagnetic waves. Since the range of the spectrum used here (13.56 MHz) comprises only a few centimetres to decimetres, the electrical insulation of the NFC transponder from the registration number plate body is particularly important. Only through sufficient electrical insulation is it possible to ensure that sufficient energy is absorbed by the NFC transponder, so that corresponding information is emitted by the transponder again.

There can preferably also be provision that the NFC transponder is arranged in an electrically non-conductive housing, and the housing is positioned directly on the registration number plate body. This housing can advantageously be a housing composed of a plastic, a resin or the like. Electrically non-conductive housings can be penetrated by electromagnetic alternating fields without appreciable attenuation or losses. At the same time, the electrical decoupling of the NFC transponder from the registration number plate body is sufficient to ensure a particularly efficient and reliable application of the vehicle identification means. This housing with the transponder can also be what is referred to as a Hart tag.

A vehicle identification means for achieving the object mentioned at the beginning is a vehicle identification means, in particular vehicle registration number plate having a registration number plate body which has at least one inscription space, and having at least one inscription which is assigned to the inscription space of the registration number plate body, wherein at least one NFC transponder which can be read out in a contactless fashion and has the purpose of near-field communication is assigned to the registration number plate body, having a data carrier and an antenna, and wherein the registration number plate body is covered with a protective cover, characterized in that the registration number plate body has a UHF antenna which is formed by a slot, and this UHF antenna is assigned a data carrier which generates a magnetic field, wherein the antenna of the NFC transponder is at least partially assigned to the slot, or the NFC transponder with the antenna and the data carrier on a carrier material, is assigned to the registration number plate body. Accordingly, there is provision that a registration number plate body of the vehicle identification means has a UHF antenna which is formed by a slot, and this UHF antenna is assigned a data carrier which generates a magnetic field, wherein the one antenna of an NFC transponder, which is also assigned to the registration number plate body, is assigned to this slot, and the slot which serves here as a UHF antenna acts as it were as a breakthrough for the NFC transponder in the previously described manner. Accordingly, the vehicle identification means can be read out and transmitted both in the UHF and NFC or HF frequency ranges. By virtue of this combination of a data carrier with a UHF antenna and an NFC transponder, which both use the same slot or breakthrough for their application, it is possible to implement a particularly simple design of a vehicle identification means which functions particularly reliably.

In particular it constitutes one advantageous development of the present invention that the NFC transponder is arranged, in particular with the antenna and the data carrier, in a recess in the registration number plate body. By virtue of this recess, further integration of the transponder into the registration number plate body can be carried out, which serves to provide increased safety with respect to environmental influences and mechanical damage.

Furthermore, for the vehicle identification means according to the invention it can preferably be provided that the antenna of the NFC transponder is arranged at least partially, preferably completely, in or over the slot or a breakthrough, in particular on a front side or a rear side of the registration number plate body.

There is preferably provision that the data carrier is coupled inductively to the slot, wherein the data carrier has a chip, at least one coil which is connected thereto in an electrically conductive fashion, and a carrier composed of an insulating or non-conductive material, and the chip is embodied, in particular, as a passive radio-frequency-identification chip (RFID chip). This ultra high-frequency wave range, also referred to as decimeter waves or microwave range, is typically between 0.3 GHz and 3 GHz. Reading out is typically carried out here at a distance of several meters but can also be carried out at relatively small distances. Reading out of a data carrier in a frequency range does not disrupt the reading out of a further data carrier in another frequency range. Therefore, various data items of one data carrier or of different data carriers can be read out in a plurality of frequency ranges independently of one another. This applies, in particular, if a plurality of separate data carriers are provided which preferably operate in different frequency ranges. A separate antenna or antenna structure is particularly preferably designed and/or optimized for separate reading out for each of the frequency ranges.

One preferred development of the invention can provide that the RFID chip is arranged in an electrically insulated fashion in the region of an end of the slot, and the NFC transponder is assigned to an opposite end region of the slot, wherein the slot is preferably extended by the length over which the NFC transponder covers the slot. As a result of this arrangement of the two transponders which operate in different frequency ranges, the slot can be used both as a breakthrough for the NFC transponder and as a slot antenna for the RFID chip. Therefore, both a reliable and efficiently operating RFID transponder as well as an NFC transponder can be assigned in a simple way to a registration number plate body through a single breakthrough or slot. There may preferably be provision that the data carrier is arranged in an insulated fashion within the slot or over the slot, preferably electrically conductive components of the data carrier are spaced apart from boundary faces of the slot. The slot can be used as an antenna by virtue of capacitive and/or inductive coupling of the data carrier or of the RFID chip to said slot. In this context, a further antenna of the RFID chip and the slot antenna can be used as amplifier elements for increased transmission and reception performance.

Furthermore, the present invention can provide that the data carrier is embedded in the registration number plate body, in particular secured in the slot, preferably by at least one coating on the registration number plate body. This embedding of the data carrier by means of a sealing compound, such as for example a plastic or a resin, protects the RFID chip or data carrier against tampering and/or environment influences. As a result of this securement within the slot, a vehicle identification means is provided which is planar, apart from the stamped inscription space and a stamped edge region. Insofar as the registration number plate body is provided with a protective layer it is not apparent from the outside that the identification means has a data carrier. This provides, in particular, protection against tampering and destruction of the data carrier.

There can also be provision that at least one visible coating is embodied as an, in particular, self-adhesive reflective film which is preferably embodied in the region of the data carrier and/or of the slot and/or of the NFC transponder in such a way that it does not have any electrically conductive components, in particular that the coating has a very high ohmic resistance. This coating which is demetallized at least in the region of the slot is applied to the registration number plate via the slot in such a way that the demetallized region coincides at least partially with the slot. As a result, particularly effective coupling of an external electromagnetic field to the slot antenna can be carried out. The coupling to the antenna of the NFC transponder, which at least partially overlaps the slot, can be improved by this demetallization of the coating, in particular of the reflective foil.

In particular, the invention can provide that the data carrier is arranged in a receptacle recess in the registration number plate body, wherein the receptacle recess is preferably assigned to one end of the slot and preferably has a base wall into which one end of the slot extends, or the base wall has an opening which is smaller than the data carrier. As a result of the positioning of the data carrier and/or of the RFID chip in the open recess, the data carrier can be integrated into the registration number plate body in a particularly secure way.

Furthermore, there can be provision according to the invention that the RFID chip and the NFC transponder form one structural unit with two antennas for the HF and UHF frequency range, which RFID chip and NFC transponder can be read out independently of one another. By virtue of a common housing of the RFID chip and of the NFC transponder, the registration number plate can be equipped with the electronic components in a particularly simple, convenient and space-saving way. Since the frequency ranges of the RFID chip and of the NFC transponder do not overlap, there is also no mutual interference during the transmission or reception of data. Instead it is conceivable that the RFID chip and the NFC transponder share components, such as for example a memory or other lines. Finally, there can be provision that the protective cover is embodied as a flexible, self-adhesive and retroreflective film, with preferably integrated or encapsulated microglass beads, or as a prismatic film, wherein preferably at least one layer of the film contains metallic particles which are electrically conductive, or that the protective cover is constructed from an electrically conductive material, in particular from aluminium or sheet metal or from an electrically non-conductive material, in particular plastic or acrylic.

An additionally preferred exemplary embodiment of the present invention can provide that the registration number plate body is constructed from an electrically conductive material, in particular from aluminium or sheet metal, or from an electrically non-conductive material, a polymer, in particular from a plastic such as acrylic, or that the registration number plate body is embodied as a flexible, self-adhesive and/or retroreflective film, with preferably integrated or encapsulated microglass beads or as a prismatic film, wherein preferably at least one layer of the film contains metallic particles which are electrically conductive.

BRIEF DESCRIPTION OF THE DRAWINGS

Preferred exemplary embodiments of the invention are explained in more detail below with reference to the drawing, in which.

DETAILED DESCRIPTION OF PREFERRED EMBODIMENTS

Figure 1:
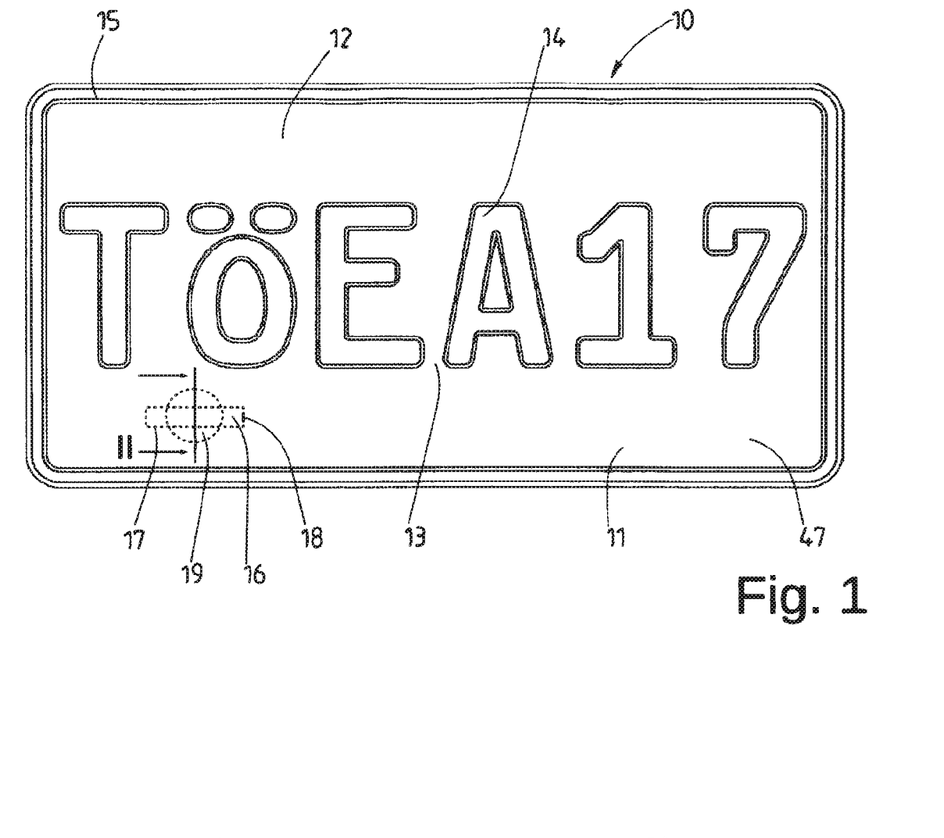
FIG. 1 shows a vehicle identification means according to the invention with a breakthrough.

A vehicle identification means 10 or else vehicle registration number plate according to the invention is composed of a flat registration number plate body 11 with a front side 47 and a rear side 48, wherein the registration number plate body 11 has a protective cover 12 (FIG. 1). The present case is concerned with essentially rectangular exemplary embodiments of the vehicle identification means 10. However, virtually any desired other geometric shapes of the registration number plate body 11 are also possible. This depends, in particular, on the local, regional or national provisions such as corresponding legal or other regulations.

The vehicle identification means 10 which is illustrated in the figures has an inscription space 13 which is assigned to the front side 47 of the identification means 10. An inscription 14, which serves for the purpose of identification, is provided in this inscription space 13. The inscription 14 of the registration number plate 10 can be implemented, for example, by printing, bonding, punching out or stamping. However, it is also conceivable that the inscription 14 of the registration number plate 10 is applied by a generative method or by means of a 3D printing method. The inscription 14 itself is not limited to the letters and numbers shown here. Instead, it can contain any type of inscription and combination of characters or the like, including figurative representations. However, in particular at least the official registration number plate or the number is frequently applied at this point to a number plate for the purpose of identifying the vehicle.

Furthermore, the vehicle identification means 10 illustrated here has a peripheral border 15 which is manufactured by stamping. In addition to the vehicle identification means 10 which is illustrated here and is composed of aluminium or sheet metal, it is also conceivable to manufacture an identification means and/or the registration number plate body 11 from plastic or acrylic. The use of the material is generally also predefined by national provisions.

The vehicle identification means 10 which is illustrated in FIG. 1, or the registration number plate body 11, is assigned a rectangular breakthrough 16. This breakthrough 16 is provided as a cutout or as a free space in the registration number plate body 11, and extends from a surface of the registration number plate body 11 to an underside and/or from the front side 47 to a rear side 48. In the exemplary embodiment of the breakthrough 16 which is illustrated in FIG. 1, a length 17 of the rectangular breakthrough 16 is larger than a height 18 of the breakthrough 16. In the exemplary embodiment of the breakthrough 16 illustrated here, the length 17 is oriented in parallel with a side edge of the vehicle identification means 10. However, the length 17 or the breakthrough 16 can also have any desired orientation with respect to the side edge of the vehicle identification means 10.

An NFC transponder 19, which has an antenna 20 and a data carrier 21 or chip, is arranged over the breakthrough 16. According to the invention, the NFC transponder 19 is positioned over the breakthrough 16 in such a way that the antenna 20 extends at least partially over the breakthrough 16.

In the exemplary embodiment illustrated here, the NFC transponder 19 is arranged with the antenna 20 and the data carrier 21 on a carrier material 22. This carrier material 22 is electrically insulating and can be embodied at least partially to be self-adhesive on one side or on both sides. According to FIG. 2, this carrier material 22 is applied, together with the NFC transponder 19, to the registration number plate body 10, specifically in such a way that it covers the breakthrough 16 at least partially. The carrier material 22 and the remaining free surface of the registration number plate body 11 are covered by the protective cover 12. This protective cover 12 can be a flexible, self-adhesive and/or retroreflective film, with preferably integrated or encapsulated microglass beads or else a prismatic and PVC film which serve for reflecting light. Furthermore, at least one layer of this protective cover 12 can contain metallic particles which are electrically conductive. As a result of the planar application of the carrier material 22 together with the NFC transponder 19 and the coverage of the protective cover 12 of the registration number plate body 11, the presence of the NFC transponder 19 is not apparent on the surface of the vehicle identification means 10. Furthermore, there can be provision that the breakthrough 16 is always filled with a material, wherein the material serves to secure and to protect the electronic components (transponder, antenna, conductor, memory).

A further exemplary embodiment (not illustrated here) can provide that the NFC transponder 19 is assigned to the rear side 48 of the registration number plate body 11. In this context, the NFC transponder 19 is to be attached to the rear side 48 in the same way as previously described for the front side 47. With this positioning, the NFC transponder 19 is provided with increased protection since the registration number plate body 11 serves as a further protective shield against mechanical influences.

Figure 3:
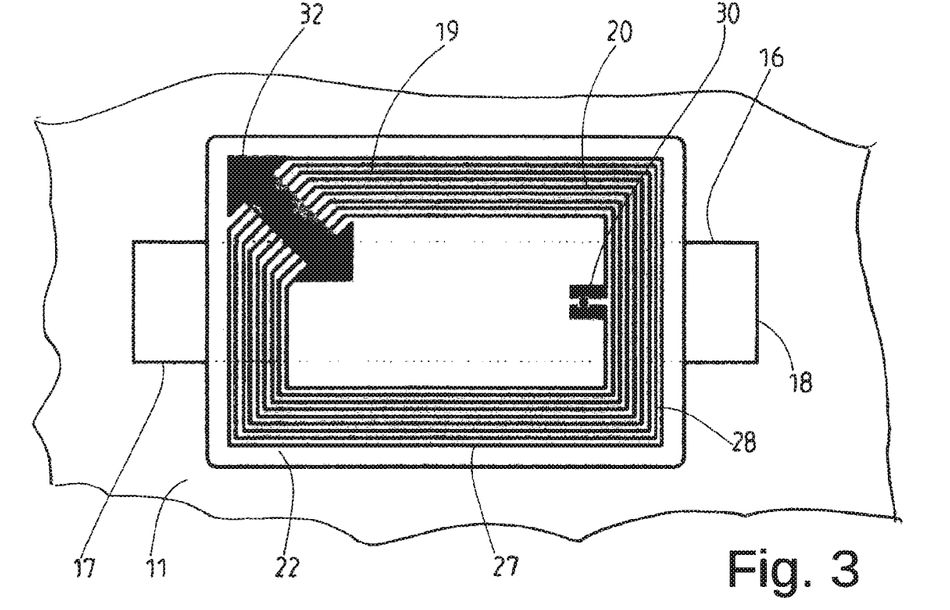
FIG. 3 shows an illustration of a breakthrough with an NFC transponder.
Figure 4:
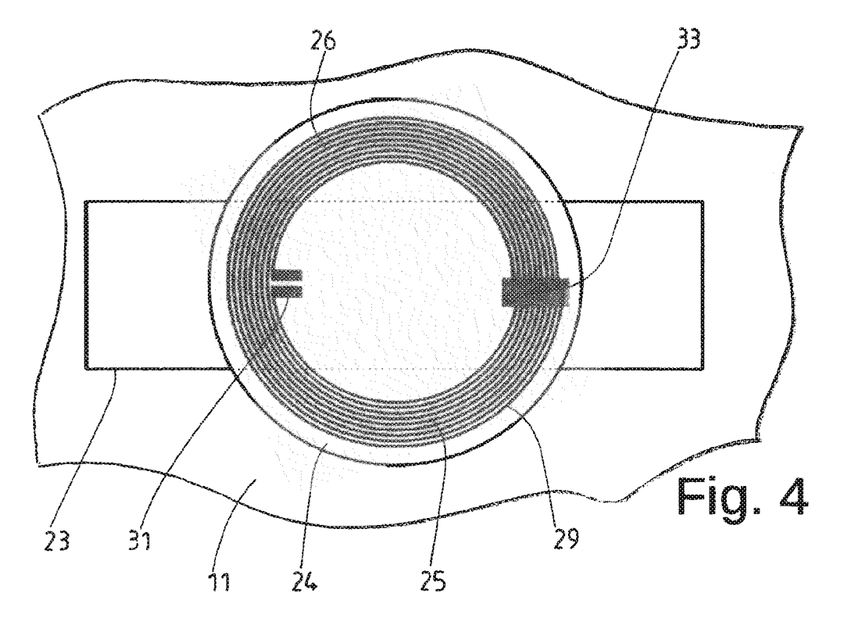
FIG. 4 shows a further exemplary embodiment of a breakthrough with an NFC transponder.

FIGS. 3 and 4 show two possible exemplary embodiments of a breakthrough 16, 23 with a carrier material 22 or 24, wherein the carrier materials 22, 24 are each assigned an NFC transponder 19, 25, with different antenna structures 20, 26. While the antenna structure 20 of the NFC transponder 19 is embodied as a rectangle, the antenna structure 26 of the NFC transponder 25 describes a ring.

Figure 2:
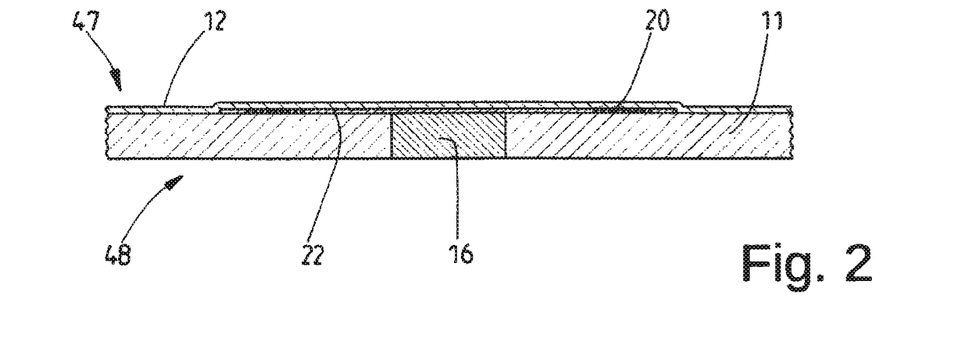
FIG. 2 shows a section through a vehicle identification means according to the invention in the region of a breakthrough and of a data carrier according to FIG. 1.

So that an external electromagnetic field can couple to the NFC transponder 19, 25 in a reliable and efficient way, it is essential that the breakthrough 16, 23 is larger than the antenna 20, 26 at least one in dimension. There is therefore provision, for example, for the exemplary embodiment in FIG. 3 that a side edge 27 of the antenna 20 or of the antenna structure 20 is smaller than the height 18 of the breakthrough 16. If this is the case, a width 28 of the antenna 20 or of the antenna structure can be larger than the height 18 of the breakthrough 16. It is essential that at least one dimension of the antenna 20 is smaller than the length 17 or the height 18 of the breakthrough 16, with the result that an electromagnetic field can penetrate the breakthrough 16 and/or the antenna 20. The antenna 20, 26 of the NFC transponder 19, 25, 35, 42, in particular windings of the antenna 20, 26, a conductor loop or a coil, encloses a rectangular or a round or circular surface, wherein a side edge 27 of this surface corresponds in its length, or a circumference of this surface corresponds in its diameter 29, at maximum to a length 17 of the breakthrough 16, 23, or is smaller. The height 18 of the breakthrough 16, 23 corresponds to at least 10%, in particular at least 25%, preferably at least 50% of a width 28 of the surface or of the diameter 29 of the surface. In the case of the exemplary embodiment of the vehicle identification means 10 which is illustrated in FIGS. 1 and 2, effective coupling of the electromagnetic field to the NFC transponder 19 can take place only if there is such penetration.

At the same time, an external diameter 29 of the antenna 26 must be smaller than at least one dimension (length/height) of the breakthrough 23 (FIG. 4). How the antenna is ultimately embodied is of secondary importance. The antennas 20, 26 which are illustrated in FIGS. 3 and 4 are embodied as coil-like conductor loops which are each connected to a data carrier 30, 31 and a connecting piece 32, 33. The data carrier 30, 31 can be located either likewise in the breakthrough 16, 23 or on the registration number plate body 11. According to the invention, it is also conceivable for the NFC transponder 19, 25 to be positioned completely in the breakthrough 16, 23.

In particular in order to provide mechanical protection but also securement, the NFC transponder 19, 25 is cast at least partially in the breakthrough 16, 23 by a sealing compound. By virtue of the fact that the NFC transponder 19, 25 is arranged with the carrier material 22, 24 both between the registration number plate body 11 and the protective cover 12 and is cast in the breakthrough 16, 23, the NFC transponder 19, 25 cannot be removed from the vehicle identification means 10 without destruction. Therefore, a simple layered structure can provide a reliably functional identification means with increased protection against tampering.

Figure 5:
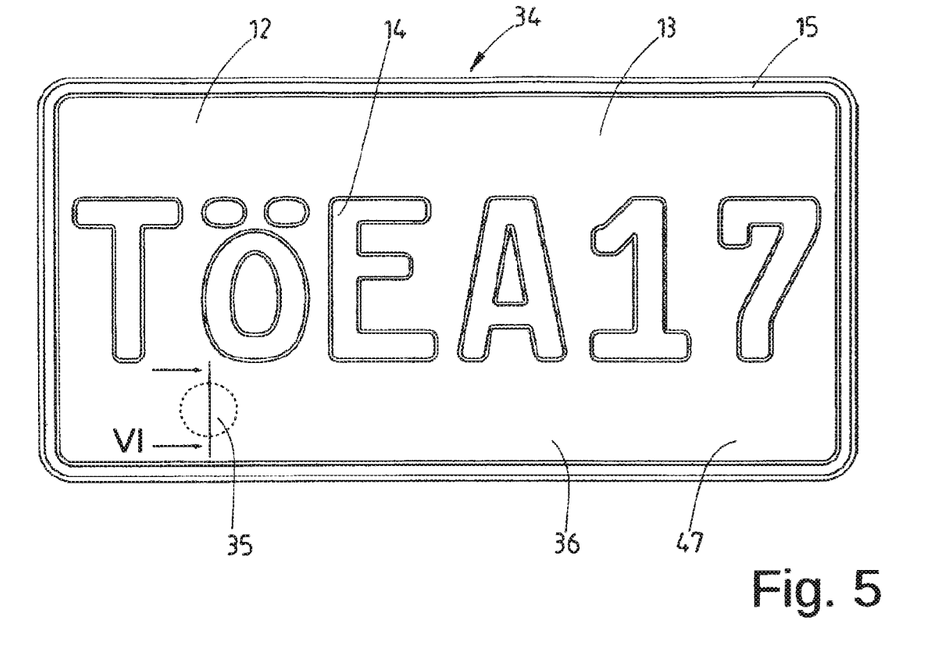
FIG. 5 shows a vehicle identification means according to the invention with an NFC transponder.

The exemplary embodiment of a vehicle identification means 34 which is illustrated in FIG. 5 is structurally identical to the vehicle identification means 10 described above, with the exception that the vehicle identification means 34 illustrated in FIG. 5 does not have a breakthrough 16, 23. Instead, in the case of the exemplary embodiment illustrated there an NFC transponder 35 is positioned on the front side 47 of the registration number plate body 36, wherein an electrically insulating layer 38 is arranged between a carrier material 37 of the NFC transponder 35 and the registration number plate body 36. This electrically insulating layer 38 can be embodied as a plastic layer which is adhesive on both sides or as a surface coating layer. Furthermore, the carrier material 37 of the NFC transponder 35 on the layer 38 is covered by a protective cover 37. This protective cover 37 is embodied in the same way as described above with reference to the exemplary embodiment in FIGS. 1 to 4.

Figure 6:
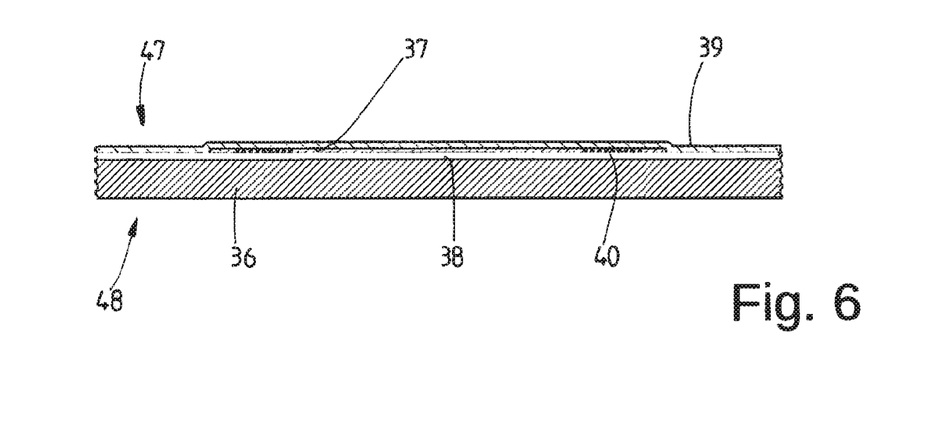
FIG. 6 shows a section through the NFC transponder according to FIG. 5.

In the exemplary embodiment of the vehicle identification means 34 illustrated in FIGS. 5 and 6, in particular an antenna 40 of the NFC transponder 35 is electrically insulated from the registration number plate body 36 by the layer 38. This is configured advantageously, in particular, for a case in which the registration number plate body 36 is of metallic design. By virtue of this layer structure, an external electromagnetic field can also be coupled to the antenna 40 of the NFC transponder 35 in a very reliable way, both to exchange data stored on a data carrier and to supply sufficient electrical energy to the NFC transponder which is embodied as a passive component. In this exemplary embodiment, the NFC transponder 35 can be arranged with the carrier material 37 at virtually any desired position on the registration number plate body 36. Moreover, there can be provision that the electrically insulating layer 38 is arranged only between the carrier material 37 and the registration number plate body 36.

A further exemplary embodiment (not illustrated here) can provide that the NFC transponder 35 is assigned to the rear side 48 of the registration number plate body 36. In this context, the NFC transponder 35 is to be attached to the rear side 48 in the same way as described above for the front side 47. Furthermore, the NFC transponder 35 which is arranged on the rear side 48 of the registration number plate body 36 is assigned a breakthrough in the registration number plate body 36 in the way described above. With this positioning, the NFC transponder 35 is provided with increased protection, since the registration number plate body 36 serves as a further protective shield against mechanical influences.

Figure 7:
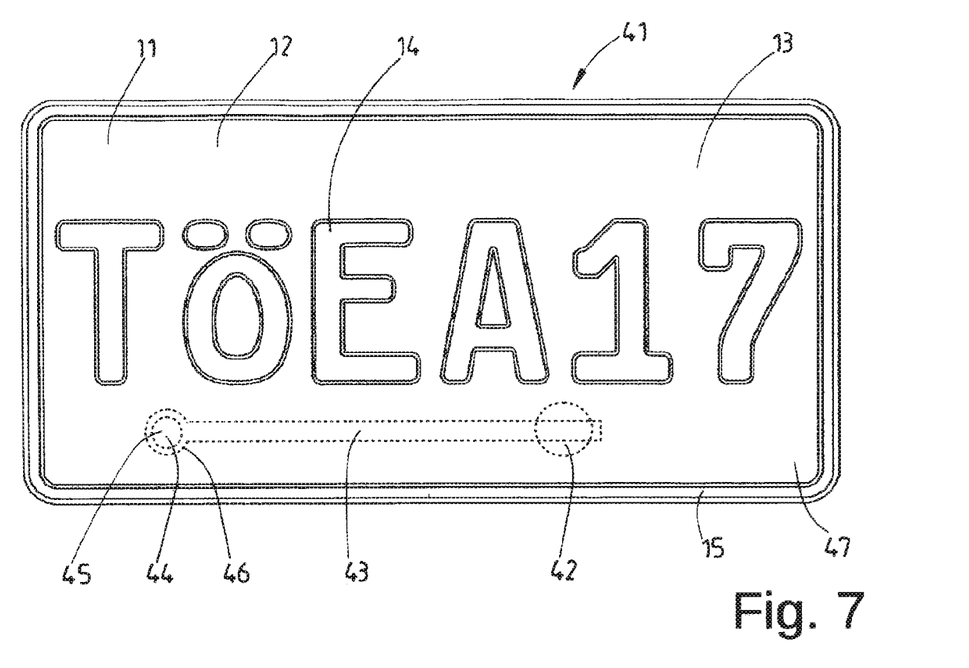
FIG. 7 shows a vehicle identification means according to the invention with an RFID chip and an NFC transponder.

In the exemplary embodiment of a vehicle identification means 41 which is illustrated in FIG. 7, a breakthrough for an NFC transponder 42 is embodied as a slot 43. While the slot 43 has the same function for the NFC transponder 42 as described above with respect to FIGS. 1 to 4, the slot 43 serves at the same time as a slot antenna for an RFID chip 44. The RFID chip 44 also has a data carrier 45 which is inductively coupled to the slot antenna or the slot 43 via a further conductor track or coil. While the RFID chip 44 is assigned to one end of the slot 43, in FIG. 7 the NFC transponder 42 is located at another end of the elongate, preferably rectangular, slot 43, specifically on a front side 47 of the registration number plate body 11. The NFC transponder 42 is positioned on the slot 43 in such a way that both a corresponding external electromagnetic field can couple to the NFC transponder 42, and the power of the slot antenna or of the slot 43 is not adversely affected by the NFC transponder 42.

The RFID chip 44 can be arranged here in a widened portion 46 at an end of the slot 43 or a recess and can be secured in this widened portion 46 or the recess by means of a sealing compound. This sealing compound can be the same compound which is also used to embed the NFC transponder 42 in the slot.

Otherwise, the vehicle identification means 41 is embodied in the same way as the vehicle identification means 10 illustrated in FIGS. 1 and 2. Moreover, it is to be noted that both the shape and the dimensions of the vehicle identification means 10, 34, 41, as well as those of the breakthrough 16, 23 or of the slot 43, can differ from those illustrated here.

A further exemplary embodiment (not illustrated here) can provide that the NFC transponder 42 can be assigned to a rear side 48 of the registration number plate body 11. In this context, the NFC transponder 42 is to be attached to the rear side 48 in the same way as described above for the front side 47. Furthermore, the NFC transponder 42 which is arranged on the rear side 48 of the registration number plate body 11 is assigned a breakthrough in the registration number plate body 11 in the way described above. With this positioning, the NFC transponder 42 is provided with increased protection, since the registration number plate body 11 serves as a further protective shield against mechanical influences.

A further exemplary embodiment (not illustrated) of the vehicle identification means 10, 34, 41 according to the invention can provide that the NFC transponder 19, 35, 42 is arranged in a recess in the registration number plate body 11, 36. The recess can be assigned here both to a front side 47 and to a rear side 48. As a result of the positioning of the NFC transponder 19, 35, 42 in the recess, said NFC transponder is, on the one hand, protected against environmental influences and, on the other hand, is virtually imperceptible under a protective cover, and therefore additionally protected against attempts at tampering.

LIST OF REFERENCE NUMBERS

10 Vehicle identification means
11 Registration number plate body
12 Protective cover
13 Inscription space
14 Inscription
15 Border
16 Breakthrough
17 Length
18 Height
19 NFC transponder
20 Antenna
21 Data carrier
22 Carrier material
23 Breakthrough
24 Carrier material
25 NFC transponder
26 Antenna
27 Side edge
28 Width
29 Diameter
30 Data carrier
31 Data carrier
32 Connecting piece
33 Connecting piece
34 Vehicle identification means
35 NFC transponder
36 Registration number plate body
37 Carrier material
38 Layer
39 Protective cover
40 Antenna
41 Vehicle identification means
42 NFC transponder
43 Slot
44 RFID chip
45 Data carrier
46 Widened portion
47 Front side
48 Rear side

The invention claimed is:

1. A vehicle identification means (10, 34, 41), in particular a vehicle registration number plate having a registration number plate body (11, 36) which has at least one inscription space (13), and having at least one inscription (14) which is assigned to the at least one inscription space (13) of the registration number plate body (11, 36), wherein at least one NFC transponder (19, 25, 35, 42), which can be read out in a contactless fashion and has the purpose of near-field communication, is assigned to the registration number plate body (11, 36), the at least one NFC transponder (19, 25, 35, 42) having a data carrier (21, 30, 31) and an antenna (20, 26), wherein the registration number plate body (11, 36) is covered with a protective cover (12, 39), wherein the registration number plate body (11, 36) has a breakthrough (16, 23), to which the antenna (20, 26) of the NFC transponder (19, 25, 35, 42) is at least partially assigned, wherein the antenna (20, 26) encloses an area that is rectangular, round, or circular, wherein a side edge (27) of the area corresponds in length, circumference, or diameter (29), respectively, of the area, at maximum to a length (17) of the breakthrough (16, 23), wherein the antenna (20, 26) is arranged at any desired position in the breakthrough (16, 23), wherein at least two partial regions of the antenna (20, 26) which lie opposite one another are arranged over the breakthrough (16, 23).

2. The vehicle identification means (10, 34, 41) according to claim 1, wherein the data carrier (21, 30, 31) and/or at least sections of the antenna (20, 26) of the NFC transponder (19, 25, 35, 42) are cast in the breakthrough (16, 23) in an electrically non-conductive sealing compound, namely a plastic or a resin, whereby the breakthrough (16, 23) is filled with the sealing compound.

3. The vehicle identification means (10, 34, 41) according to claim 1, wherein windings of the antenna (20, 26) of the NFC transponder (19, 25, 35, 42), includes a conductor loop or a coil, a rectangular or a round or circular surface, the surface having a side edge (27) corresponding in length, circumference, or diameter (29), respectively, at maximum to a length (17) of the breakthrough (16, 23), and a height (18) of the breakthrough (16, 23) corresponds to at least 10% of a width (28) of the surface or of the diameter (29) of the surface, respectively.

4. The vehicle identification means (10, 34, 41) according to claim 1, wherein the NFC transponder (19, 25, 35, 42) with the antenna (20, 26) and the data carrier (21, 30, 31) is arranged on a self-adhesive carrier material (22, 24, 37) directly on a front side (47) of the registration number plate body (11, 36) and at least partially over the breakthrough (16, 23), and the protective cover (12, 39) is applied to the registration number plate body (11, 36) over the NFC transponder (19, 25, 35, 42).

5. The vehicle identification means (10, 34, 41) according to claim 1, wherein the NFC transponder (19, 25, 35, 42) with the antenna (20, 26) and the data carrier (21, 30, 31) is arranged on a self-adhesive carrier material (22, 24, 37) directly on a rear side (48) of the registration number plate body (11, 36) and at least partially over the breakthrough (16, 23).

6. The vehicle identification means (10, 34, 41) according to claim 5, wherein the NFC transponder (19, 25, 35, 42) with the antenna (20, 26) and the data carrier (21, 30, 31) on the carrier material (22, 24, 37) is assigned to the registration number plate body (11, 36).

7. The vehicle identification means (10, 34, 41) according to claim 6, wherein the NFC transponder (19, 25, 35, 42) is attached directly on the protective cover (12, 39) in a recess on a front side (47), preferably in a recess in the registration number plate body (11, 36) and the protective cover (12, 39) or a protective film is applied to the registration number plate body (11, 36) over the NFC transponder (19, 25, 35, 42) wherein, in particular, the NFC transponder (19, 25, 35, 42) is cast in the recess (Z) with a sealing compound.

8. The vehicle identification means (10, 34, 41) according to claim 6, wherein the NFC transponder (19, 25, 35, 42) is attached directly in a recess on a rear side (48) of the registration number plate body (11, 36), wherein the NFC transponder (19, 25, 35, 42) is cast in the recess with a sealing compound.

9. The vehicle identification means (10, 34, 41) according to claim 6, wherein an electrically insulating layer (38) in the form of a plastic or a surface coating agent layer, is arranged between the self-adhesive, carrier material (22, 24, 37) of the NFC transponder (19, 25, 35, 42) and the registration number plate body (11, 36).

10. The vehicle identification means (10, 34, 41) according to claim 6, wherein the NFC transponder (19, 25, 35, 42) is arranged in an electrically non-conductive housing, and the housing is positioned directly on the registration number plate body (11, 36).

11. A vehicle identification means (10, 34, 41), in particular vehicle registration number plate having a registration number plate body (11, 36) which has at least one inscription space (13), and having at least one inscription (14) which is assigned to the at least one inscription space (13) of the registration number plate body (11, 36), wherein at least one NFC transponder (19, 25, 35, 42) which can be read out in a contactless fashion and has the purpose of near-field communication, is assigned to the registration number plate body (11, 36), the at least one NFC transponder (19, 25, 35, 42) having a data carrier (21, 30, 31) and an antenna (20, 26), wherein the registration number plate body (11, 36) is covered with a protective cover (12, 39), wherein the registration number plate body (11, 36) has a UHF antenna which is formed by a slot (43), and this UHF antenna is assigned a data carrier (45) which generates a magnetic field, wherein the antenna (20, 26) of the NFC transponder (19, 25, 35, 42) is at least partially assigned to the slot (43), or the NFC transponder (19, 25, 35, 42) with the antenna (20, 26) and the data carrier (21, 30, 31) on a carrier material (22, 24, 37), is assigned to the registration number plate body (11, 36)

wherein windings of the antenna (20, 26) of the NFC transponder (19, 25, 35, 42), include a conductor loop or a coil, a rectangular or a round or circular surface, the surface having a side edge (27) corresponding in length, circumference, or diameter (29), respectively, at maximum to a length (17) of the breakthrough (16, 23), and a height (18) of the breakthrough (16, 23) corresponds to at least 10% of a width (28) of the surface or of the diameter (29) of the surface, respectively.

12. The vehicle identification means (10, 34, 41) according to claim 11, wherein the NFC transponder (19, 25, 35, 42) is arranged with the antenna (20, 26) and the data carrier (21, 30, 31) in a recess in the registration number plate body (11, 36).

13. The vehicle identification means (10, 34, 41) according to claim 11, wherein the antenna (20, 26) of the NFC transponder (19, 25, 35, 42) is arranged at least partially in or over the slot (43) or a breakthrough (16, 23) on a front side (47) or a rear side (48) of the registration number plate body (11, 36).

14. The vehicle identification means (10, 34, 41) according to claim 11, wherein the data carrier (45) is coupled inductively to the slot (43), wherein the data carrier (45) has a chip, at least one coil which is connected thereto in an electrically conductive fashion, and a carrier composed of an insulating or non-conductive material, and the chip is embodied as a passive radio-frequency-identification chip (44) (RFID chip).

15. The vehicle identification means (10, 34, 41) according to claim 11, wherein the data carrier (45) is arranged in an electrically insulated fashion in the region of an end of the slot (43), and the NFC transponder (19, 25, 35, 42) is assigned to an opposite end region of the slot (43), wherein the slot (43) is extended by the length over which the NFC transponder (19, 25, 35, 42) covers the slot (43).

16. The vehicle identification means (10, 34, 41) according to claim 11, wherein the data carrier (45) is arranged in an insulated fashion within the slot (43) or over the slot (43), wherein electrically conductive components of the data carrier (45) are spaced apart from boundary faces of the slot (43).

17. The vehicle identification means (10, 34, 41) according to claim 11, wherein the data carrier (45) is embedded in the registration number plate body (11, 36) by securing the data carrier (45) in the slot (43) by at least one coating on the registration number plate body (11, 36).

18. The vehicle identification means (10, 34, 41) according to claim 11, wherein at least one visible coating is embodied as a self-adhesive reflective film which is embodied in the region of the data carrier (45) and/or of the slot (43) and/or of the NFC transponder (19, 25, 35, 42) in such a way that it does not have any electrically conductive components, wherein the coating has a very high ohmic resistance.

19. The vehicle identification means (10, 34, 41) according to claim 11, wherein the data carrier (45) is arranged in a receptacle recess in the registration number plate body, wherein the receptacle recess is assigned to one end of the slot and has a base wall into which one end of the slot (43) extends, or the base wall has an opening which is smaller than the data carrier (45).

20. The vehicle identification means (10, 34, 41) according to claim 14, wherein the RFID chip and the NFC transponder form one structural unit with two antennas for HF and UHF frequency ranges, which RFID chip and NFC transponder can be read out independently of one another.

21. The vehicle identification means (10, 34, 41) according to claim 11, wherein the protective cover (12, 39) is embodied as a flexible, self-adhesive and retroreflective film, with integrated or encapsulated microglass beads, or as a prismatic film, wherein at least one layer of the film contains metallic particles which are electrically conductive, or in that the protective cover is constructed from an electrically conductive material, namely from aluminium or sheet metal, or from an electrically non-conductive material, namely from plastic or acrylic.

22. The vehicle identification means (10, 34, 41) according to claim 11, wherein the registration number plate body (11, 36) is constructed from an electrically conductive material, namely from aluminium or sheet metal, or from an electrically non-conductive material, namely from plastic or acrylic, or in that the registration number plate body is embodied as a flexible, self-adhesive and retroreflective film, with integrated or encapsulated microglass beads or as a prismatic film, wherein at least one layer of the film contains metallic particles which are electrically conductive.

23. The vehicle identification means (10, 34, 41) according to claim 1, wherein the height (18) of the breakthrough (16, 23) corresponds to at least 25% of a width (28) of the surface or of the diameter (29) of the surface, respectively.

24. The vehicle identification means (10, 34, 41) according to claim 1, wherein the height (18) of the breakthrough (16, 23) corresponds to at least 50% of a width (28) of the surface or of the diameter (29) of the surface, respectively.

25. A vehicle identification means (10, 34, 41), in particular a vehicle registration number plate having a registration number plate body (11, 36) which has at least one inscription space (13), and having at least one inscription (14) which is assigned to the at least one inscription space (13) of the registration number plate body (11, 36),
wherein at least one NFC transponder (19, 25, 35, 42), which can be read out in a contactless fashion and has the purpose of near-field communication, is assigned to the registration number plate body (11, 36), the at least one NFC transponder (19, 25, 35, 42) having a data carrier (21, 30, 31) and an antenna (20, 26),
wherein the registration number plate body (11, 36) is covered with a protective cover (12, 39),
wherein the registration number plate body (11, 36) has a breakthrough (16, 23), to which the antenna (20, 26) of the NFC transponder (19, 25, 35, 42) is at least partially assigned,
wherein the antenna (20, 26) encloses an area that is rectangular, round, or circular, wherein a side edge (27) of the area corresponds in length, circumference, or diameter (29), respectively, of the area, at maximum to a length (17) of the breakthrough (16, 23),
wherein the antenna (20, 26) is arranged at any desired position in the breakthrough (16, 23),
wherein at least two partial regions of the antenna (20, 26) which lie opposite one another are arranged over the breakthrough (16, 23),
wherein windings of the antenna (20, 26) of the NFC transponder (19, 25, 35, 42), includes a conductor loop or a coil, a rectangular or a round or circular surface, the surface having a side edge (27) corresponding in length, circumference, or diameter (29), respectively, at maximum to a length (17) of the breakthrough (16, 23), and a height (18) of the breakthrough (16, 23) corresponds to at least 10% of a width (28) of the surface or of the diameter (29) of the surface, respectively.

\* \* \* \* \*